JOHN W. DAYTON.
Harness Rosettes.

No. 125,885.  Patented April 23, 1872.

WITNESSES

A. J. Tibbits
J. H. Shumway

John W. Dayton
Inventor
By his Att'y 125,885

UNITED STATES PATENT OFFICE.

JOHN W. DAYTON, OF WATERBURY, CONNECTICUT.

IMPROVEMENT IN HARNESS-ROSETTES.

Specification forming part of Letters Patent No. 125,885, dated April 23, 1872.

*To all whom it may concern:*

Be it known that I, JOHN W. DAYTON, of Waterbury, in the county of New Haven and State of Connecticut, have invented a new Improvement in Harness-Rosettes; and I do hereby declare the following, when taken in connection with the accompanying drawing and the letters of reference marked thereon, to be a full, clear, and exact description of the same, and which said drawing constitutes part of this specification, and represents, in—

Figure 1:
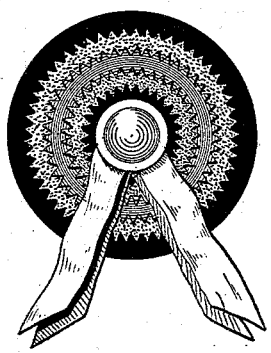
Figure 2:
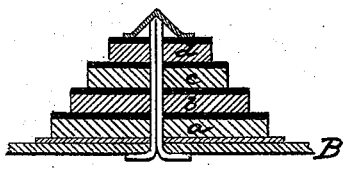

Figure 1 a front view, and in Fig. 2 a vertical central section.

This invention relates to an improvement in harness-rosettes. These have heretofore been made from leather, wood, or other material. The object of this invention is to give to this class of rosettes the appearance of a fabricated surface; and the invention consists in forming the rosette from successive layers of suitable material, each layer faced with felt, so that the felt appears upon the face only.

$a$ $b$ $c$ $d$ are successive layers of leather or suitable material, each faced or covered with a facing of felt, secured to the leather by any adhesive material; this facing being denoted in solid black in Fig. 2. Thus faced, the leather is cut into the form desired, the successive layers differing in shape and size from the preceding one, so that a piled or conical rosette is produced by the successive layers, as seen in the drawing. Through the center of these layers any suitable device is passed to secure them together, and to the part B of the harness to which it is desired to attach the rosette. The securing device is here represented as a double wire or rivet, passing through and doubled down upon the back side.

By this construction I am enabled to produce a rosette of different colors by the employment of different-colored facings; and the felt facing being practically water-proof, it is not injured by exposure or use, and is much more durable than a rosette made entirely of fabric.

I claim as my invention—

As an article of manufacture, a rosette formed from successive layers of leather or other material, the surface of each covered with felt, substantially as herein described.

JOHN W. DAYTON.

Witnesses:
H. W. KEELER,
W. R. HARRISON.